(12) United States Patent
Kawamata et al.

(10) Patent No.: US 9,479,024 B2
(45) Date of Patent: Oct. 25, 2016

(54) MULTI-PHASE COIL TERMINAL STRUCTURE AND MOTOR INCLUDING SAME

(71) Applicant: MINEBEA CO., LTD., Kitasuku-Gun, Nagano (JP)

(72) Inventors: Kohei Kawamata, Fukuroi (JP); Yukihiro Terada, Hamamatsu (JP)

(73) Assignee: Minebea Co., Ltd., Nagano (JP)

( * ) Notice: Subject to any disclaimer, the term of this patent is extended or adjusted under 35 U.S.C. 154(b) by 582 days.

(21) Appl. No.: 14/021,048

(22) Filed: Sep. 9, 2013

(65) Prior Publication Data

US 2014/0070647 A1    Mar. 13, 2014

(30) Foreign Application Priority Data

Sep. 12, 2012    (JP) .................................. 2012-200951

(51) Int. Cl.
*H02K 5/22*    (2006.01)
*H02K 3/52*    (2006.01)

(52) U.S. Cl.
CPC .............. *H02K 5/225* (2013.01); *H02K 3/525* (2013.01)

(58) Field of Classification Search
CPC ............................ H02K 3/525; H02K 5/225
See application file for complete search history.

(56) References Cited

U.S. PATENT DOCUMENTS

| | | | | |
|---|---|---|---|---|
| 5,770,900 A | * | 6/1998 | Sato | H02K 3/525 310/194 |
| 8,222,779 B2 | * | 7/2012 | Kinpara | H02K 3/525 310/49.01 |
| 8,305,180 B2 | * | 11/2012 | Wei | H01F 5/04 310/49.19 |
| 2001/0026103 A1 | * | 10/2001 | Suzuki | H02K 3/525 310/71 |
| 2014/0125160 A1 | * | 5/2014 | Nara | H02K 5/24 310/51 |

FOREIGN PATENT DOCUMENTS

| JP | 02-294299 A | 12/1990 |
|---|---|---|
| JP | H09201036 A | 7/1997 |
| JP | 09-308215 A | 11/1997 |
| JP | 2006-238617 A | 9/2006 |

OTHER PUBLICATIONS

Office Action mailed Jul. 26, 2016 corresponding to Japanese Patent Application No. 2012-200951.

* cited by examiner

*Primary Examiner* — Dang Le
(74) *Attorney, Agent, or Firm* — Carrier Blackman & Associates, P.C.; Joseph P. Carrier; Jeffrey T. Gedeon

(57) ABSTRACT

A multi-phase coil terminal structure for a motor, to which wire ends of at least two exciting coils are connected which include respective bifilar windings, is provided and includes: at least two first individual terminals each of which includes two segments; at least two second individual terminals each of which includes two segments; and an integrated common terminal which is formed in a single piece member and which includes two segments, wherein wire ends of the at least two exciting coils are connected to one segment of the two, while the other segment of the two serves as an external output, and wherein the first individual terminals, the second individual terminals, and the integrated common terminal are partly molded.

10 Claims, 13 Drawing Sheets

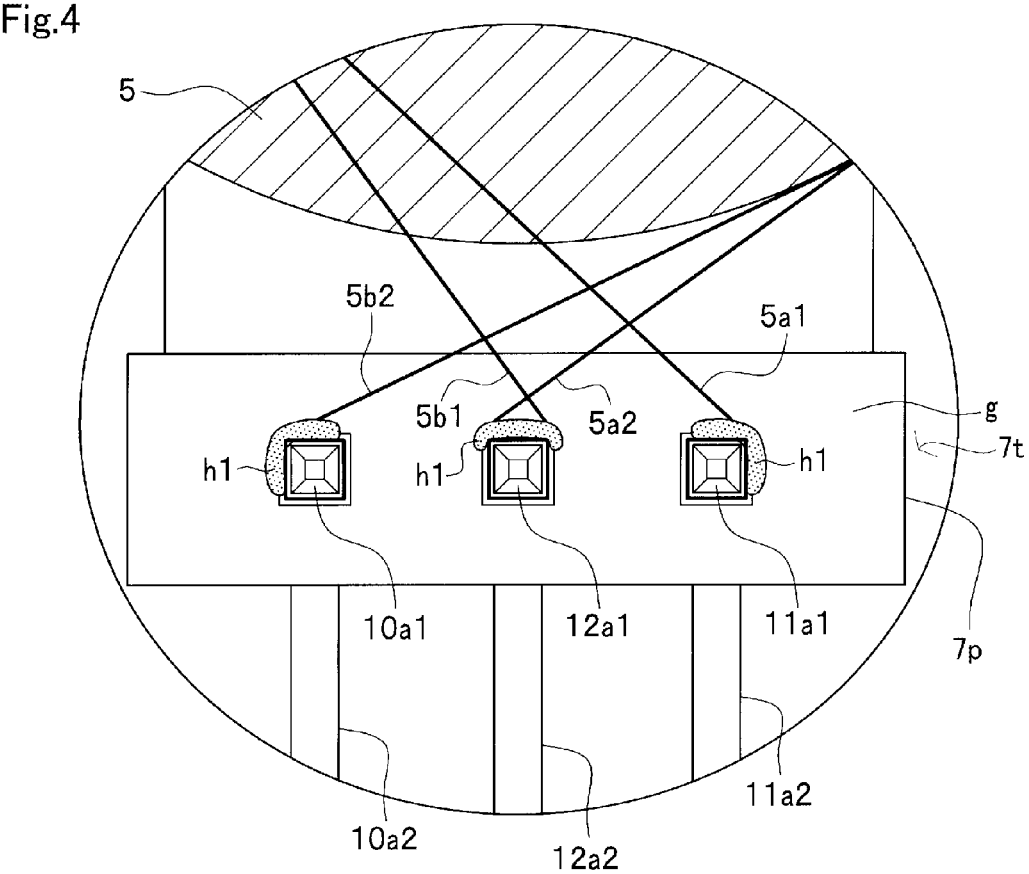

-- Prior Art --

Fig.16    -- Prior Art --
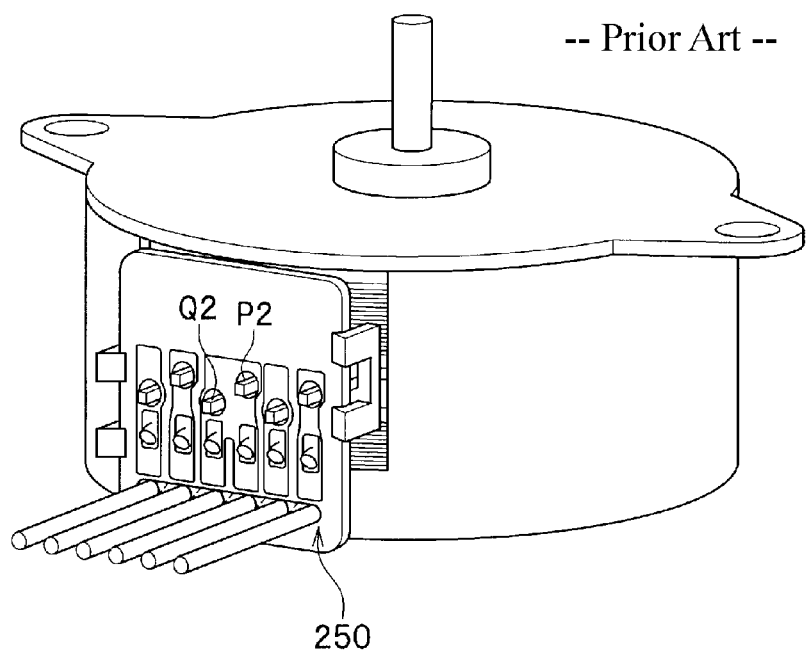
250
Fig.17    -- Prior Art --
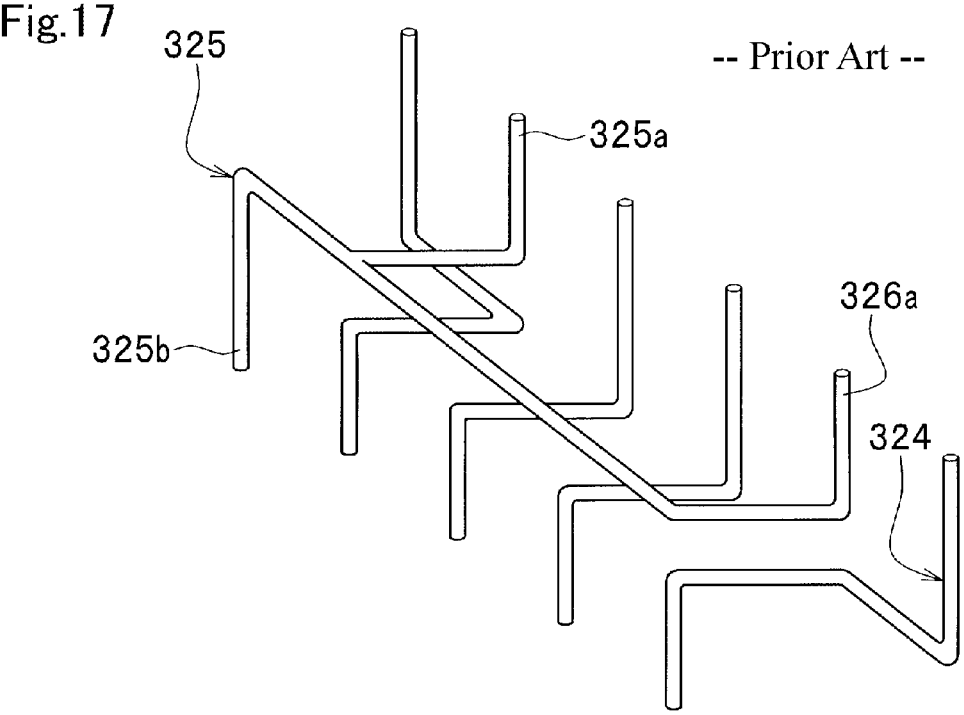
325
325a
325b
326a
324

MULTI-PHASE COIL TERMINAL STRUCTURE AND MOTOR INCLUDING SAME

BACKGROUND OF THE INVENTION

1. Field of the Invention

The present invention relates to a multi-phase coil terminal structure used with a multi-phase coil for use in a motor, and to a motor including the same.

2. Description of the Related Art

A motor is easy to control, and therefore has conventionally been used, as a driving source of a mechanical structure, in various equipments such as industrial instruments and household appliances. The more these various equipments become widespread, the more and more the improvement in the reliability of the equipments is demanded. Under the circumstance described above, it is a matter of course that the improvement in the reliability of a motor used in those equipments is also demanded.

For the purpose of improving the reliability, it may be needed that a short circuit is made between two common terminals in a uni-polar drive circuit in which electric current is caused to flow through a coil of a motor in one direction.

One method for making a short circuit is disclosed in Japanese Patent Application Laid-Open No. H02-294299. Referring to FIG. 15 herein, a plate-like conduction means (conduction member 130) is provided to connect between two terminals 126B and 128B, wherein the terminals 126B and 128B are inserted respectively in openings 130A and 130B of the conduction means (conduction member 130).

Also, another method for making a short circuit between common terminals is disclosed in Japanese Patent Application Laid-Open No. 2006-238617. Referring FIG. 16 herein, a terminal substrate (PC board) 250 is used to make a short circuit between common terminals Q2 and P2.

Further, still another method is disclosed in Japanese Patent Publication Laid-Open No. H09-308215. Referring to FIG. 17 herein, common terminals 325a and 326a are joined to each other for unification, and also it is conventionally known that an output terminal 325b is formed at the connection portion of the common terminals 325a and 326a.

However, in the method described in Japanese Patent Application Laid-Open No. H02-294299, there is a problem that when the plate-like conduction means (conduction member 130) is attached to connect between the terminals 126B and 128B, soldered portions of the terminals 126B and 128B are scratched by edges of the openings 130A and 130B thus causing rust, which results in difficulty to assure a long term reliability.

Also, there is another problem about reliability found in the above method that since the plate-like conduction means (conduction member 130) is exposed, if starting/finishing wire ends of windings wrapped around other terminals 128A, 128C, 126A and 126C stick out, then an unintended short circuit may be caused between the plate-like means (conduction member 130) and the other terminals 128A, 128C, 126A and 126C. Further, an assembly process of attaching the plate-like conduction means between the terminals 126B and 128B is additionally required thus causing a cost increase problem.

In the method described in Japanese Patent Application Laid-Open No. 2006-238617, the component cost for the terminal substrate 250 is required, and also a cost increase occurs due to requirement of an assembly process, a soldering process and a solder material cost. And, there are concerns about reliability inherent in soldering work (poor soldering, negligence to solder, solder bridge, and the like).

In the method described in Japanese Patent Publication Laid-Open No. H09-308215, for the reason of design requirement of a device to be connected, two common terminals 325a and 326a are joined to each other and unified into one output terminal. This method is superior to the above described two methods in terms of cost and reliability, but since a directional property (orientation) is predefined in the terminal arrangement, caution and check are required in order to avoid making a mistake with respect to the direction or orientation during work processes of winding, coil terminal treatment, motor assembly and the like, which lowers operating efficiency and which eventually results in inviting a cost increase. Also, since this method carries a risk of making a mistake with respect to the direction or orientation, there exists a reliability problem, too.

SUMMARY OF THE INVENTION

The present invention has been made in light of the circumstances described above, and it is an object of the present invention to provide a multi-phase coil terminal structure which, while assuring a high reliability, can be produced with a cost increase held down, and also to provide a motor which is provided with such a multi-phase coil terminal structure.

In order to achieve the object described above, according to a first aspect of the present invention, there is provided a multi-phase coil terminal structure for a motor, to which wire ends of at least two exciting coils are connected which include respective bifilar windings, wherein the multi-phase coil terminal structure includes: at least two first individual terminals which each include two segments to one of which a wire end of a first exciting coil of the at least two exciting coils is connected, and the other one of which serves as an external output; at least two second individual terminals which each include two segments to one of which a wire end of a second exciting coil of the at least two exciting coils is connected, and the other one of which serves as an external output; and an integrated common terminal which is formed in a single piece member and which includes two segments to one of which wire ends of the first and second exciting coils are connected, and the other one of which serves as an external output, and wherein: the first individual terminals, the second individual terminals, and the integrated common terminal are partly molded with an insulating synthetic resin; the first individual terminals are disposed symmetric respectively to the second individual terminals with a predetermined distance therebetween; and the integrated common terminal is symmetrically configured.

According to the configuration described above, since the integrated common terminal is formed in a single piece member, the production and assembly work is easy thus enabling a cost reduction, and since the integrated common terminal is shaped symmetrically, the component can be handled easily resulting in avoiding mistakes in assembly work.

In the first aspect of the present invention, it may be configured such that: the integrated common terminal integrally includes a first common terminal, and a second common terminal; the first individual terminals, the second individual terminals, the first common terminal, and the second common terminal are formed to have a substantially L-shape composed of two arms; and such that bent portions of the L-shape of the first individual terminals, the second individual terminals, the first common terminal and the second common terminal are solidly covered in the insulating synthetic resin, wherein uncovered areas of the two arms of the L-shape of the first individual terminals, the second individual terminals, the first common terminal and the second common terminals correspond respectively to the two segments of the first individual terminals, the second individual terminals, the first common terminal and the second common terminal.

In the first aspect of the present invention, the integrated common terminal may be configured such that respective arms of the L-shape of the first common terminal and the second common terminal, which correspond to respective segments there of serving as external outputs, are merged and unified into one segment serving as an external output so as to form a substantially T-shape with a leg.

In the first aspect of the present invention, the integrated common terminal may further include an intermediate portion which integrally bridges between a joining point of the two arms of the L-shape of the first common terminal and a joining point of the two arm of the L-shape of the second common terminal so as to form a substantially T-shape with two legs.

According to the configuration described above, since the integrated common terminal is formed in a single piece member having either a substantially T-shape with a leg or a substantially T-shape with two legs, the components can be produced and assembled easily thus enabling a cost reduction. Also, the external outputs are arrayed side by side, a universal standard connector can be used thus leading to a cost reduction.

Also, in the first aspect of the present invention, it may be configured such that: the integrated common terminal integrally includes a first common terminal, and a second common terminal; the first individual terminals, the second individual terminals, the first common terminal and the second common terminal are formed to have a substantially I-shape; and such that one end portions of the I-shape of the first individual terminals, the first common terminal, the second individual terminals and the second common terminals are solidly covered in the insulating synthetic resin, wherein proximal and distal portions of an uncovered area of the I-shape of the first individual terminals, the second individual terminals, the first common terminal and the second common terminals correspond respectively to the two segments of the first individual terminals, the second individual terminals, the first common terminal and the second common terminals.

In the first aspect of the present invention, the integrated common terminal may be configured such that the first common terminal and the second common terminal, which are each formed to have a substantially I-shape, are merged and unified into one terminal having a substantially I-shape.

In the first aspect of the present invention, the integrated common terminal may further include an intermediate portion which integrally bridges between one end of the I-shape of the first common terminal and one end of the I-shape of the second common terminal so as to form a substantially square U-shape.

According to the configuration described above, since the first individual terminals and the second individual terminals are formed to have a substantially I-shape, and since the integrated common terminal is formed in a single piece member having either a substantially I-shape or a substantially square U-shape, the component shape is simple and therefore the components can be produced easily thus enabling a cost reduction. Also, the external outputs are arrayed side by side, a universal standard connector can be used thus leading to a cost reduction.

In the first aspect of the present invention, the integrated common terminal may be centrally positioned such that the at least two first individual terminals sandwich the integrated common terminal and the at least two second individual terminals sandwich the integrated common terminal. Since the integrated common terminal is centrally positioned, the wire ends of the exciting coils can be conveniently connected thereto.

In the first aspect of the present invention, the integrated common terminal may be formed by press punching. Since the integrated terminal can be formed by press punching, the production can be performed easily.

According to a second aspect of the present invention, there is provided a motor which is provided with the multi-phase coil terminal structure according to the first aspect of the present invention.

According to the second aspect of the present invention, the motor is adapted to enjoy the advantages which are above described with respect to the multi-phase coil terminal structure.

Consequently, according to the present invention, a multi-phase coil terminal structure can be provided which, while assuring a high reliability, can be produced with a cost increase held down, and also a motor having such a multi-phase coil terminal structure can be realized.

BRIEF DESCRIPTION OF THE DRAWINGS

FIG. 4 is an enlarged schematic view of the terminal structure of the stator of FIG. 3A as seen in a direction indicated by an arrow A shown in FIG. 3A;

FIG. 12C is a perspective view of the terminal structure shown in

FIG. 12B, wherein starting/finishing wire ends of windings are wrapped around terminals;

FIG. 16 is a perspective view of another conventional terminal structure in a motor; and FIG. 17 is a perspective view of a terminal form and arrangement in still another conventional terminal structure in a motor.

DETAILED DESCRIPTION OF THE INVENTION

Exemplary embodiments of the present invention will hereinafter be described with reference to the accompanying drawings.

Figure 1:
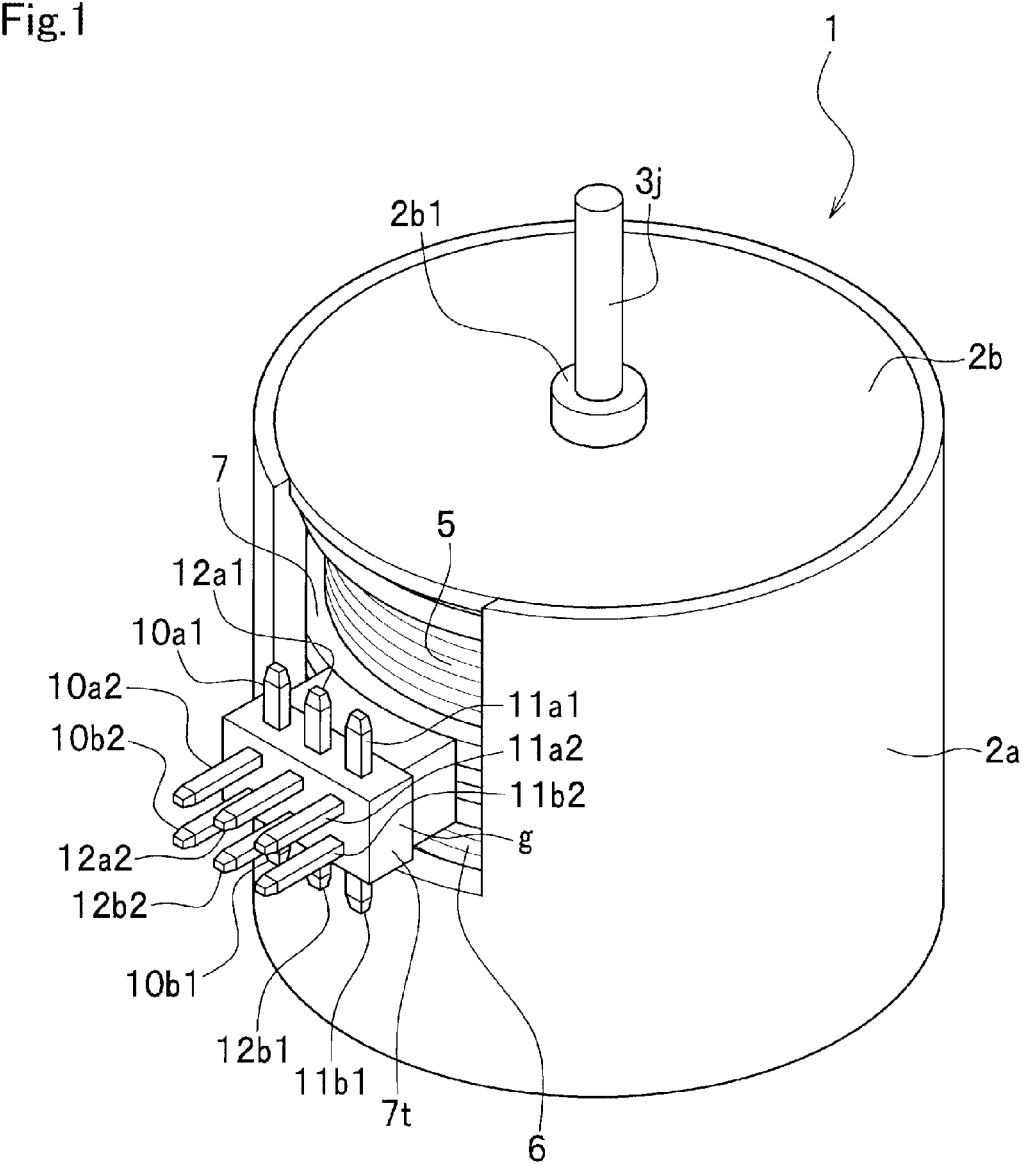
FIG. 1 is a perspective view of a motor including a multi-phase coil terminal structure (terminal structure) according to a first embodiment of the present invention.

FIG. 1 perspectively shows a claw pole (claw magnetic pole) type motor 1 including a multi-phase coil terminal structure 7t according to a first embodiment of the present invention. The claw pole type motor 1 will hereinafter be referred to simply as "motor 1" as appropriate.

Referring to FIG. 1, the motor 1 includes a lower housing 2a and an upper housing 2b which in combination form an outer case in which a rotor 3 (to be described herein later) and a stator 1K (to be described) are housed. A rotation shaft 3j of the rotor 3, which works as an output shaft of turning force of the motor 1, is provided so as to protrude from the upper housing 2b.

Figure 2:
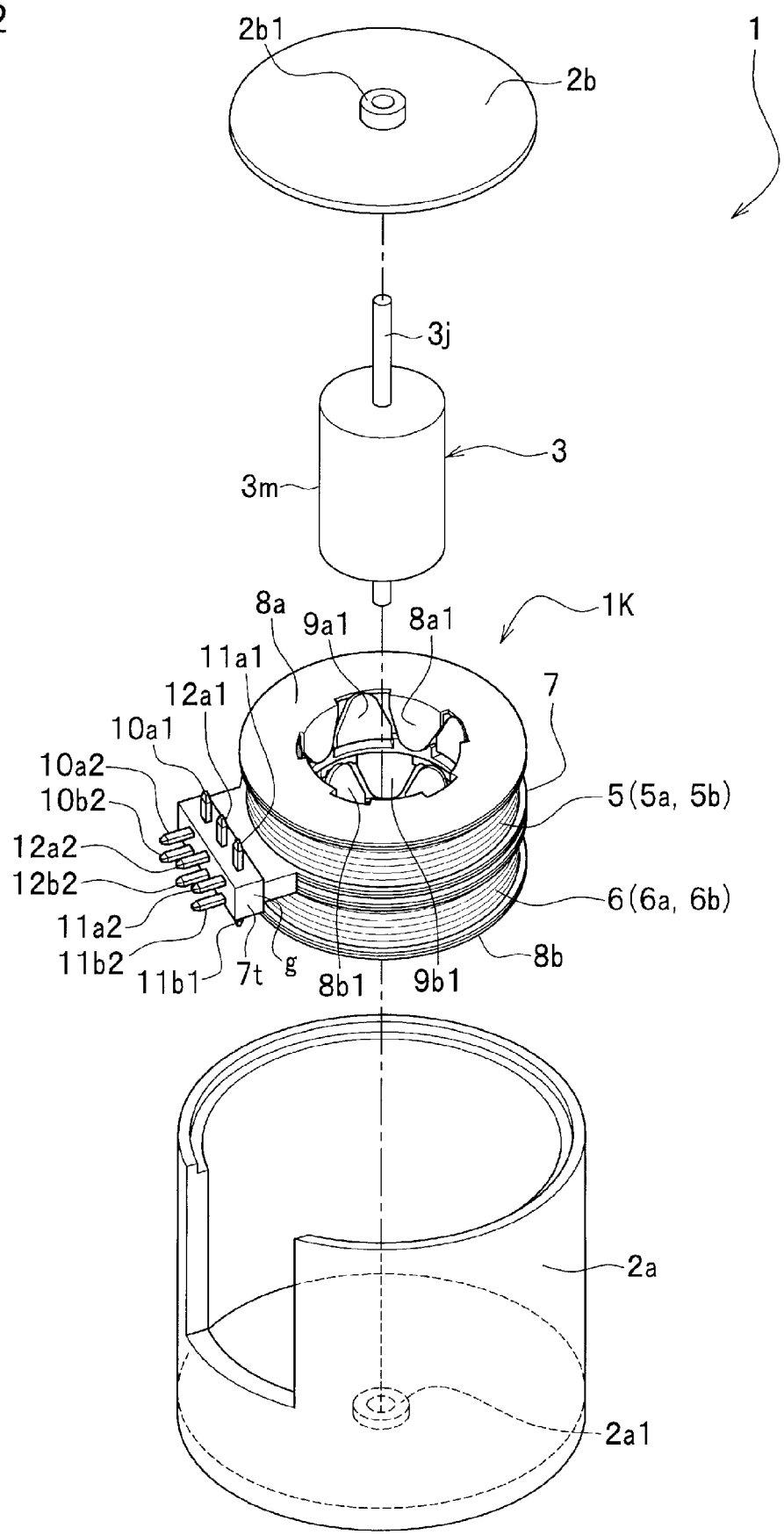
FIG. 2 is an exploded perspective view of the motor of FIG. 1.

FIG. 2 perspectively shows the motor 1 in an exploded manner. Referring to FIG. 2, the rotor 3 of the motor 1 includes a permanent magnet 3m and the rotation shaft 3j around which the permanent magnet 3m is fixedly attached.

A bearing 2a1 is attached to the lower housing 2a by fitting, press-fitting, or a like method. The rotation shaft 3j of the rotor 3 is inserted through the bearing 2a1 and rotatably supported. A bearing 2b1 is attached to the lower housing 2b by fitting, press-fitting, or a like method. The rotation shaft 3j of the rotor 3 is inserted through the bearing 2b1 and rotatably supported.

Figure 3A:
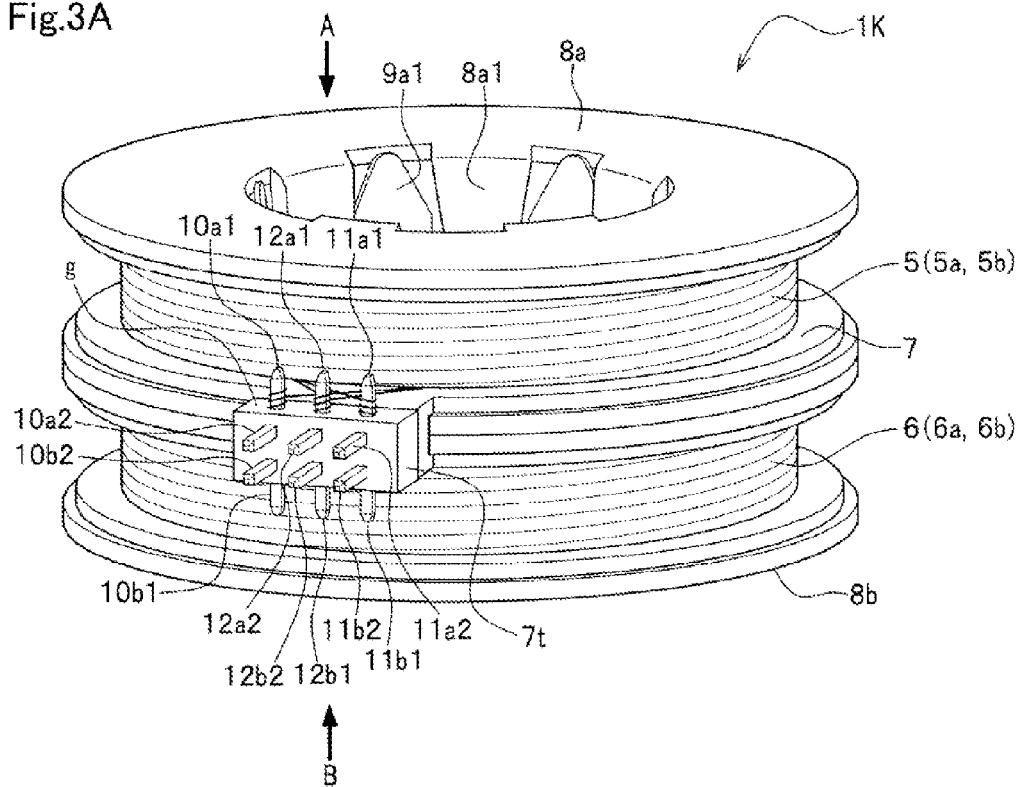
FIG. 3A is a perspective view of a stator of the motor.

FIG. 3A perspectively shows the stator 1K mentioned above. Referring to FIG. 3A, the stator 1K of the motor 1 includes a bobbin 7, at respective axial sides of which first and second exciting coils 5 and 6 are provided. The stator 1K further includes first and second outer yokes 8a and 8b located at respective axial ends of the stator 1K, and first and second inner yokes 9a and 9b (to be described; refer to FIG. 10) located at an axial center portion of the stator 1K so as to come into contact with each other side by side axially, wherein first and second pole teeth 8a1 and 8b1 are formed respectively at the first and second outer yokes 8a and 8b and bent so as to extend axially inwardly toward each other, and wherein first and second pole teeth 9a1 and 9b1 are formed respectively at the first and second inner yokes 9a and 9b and bent so as to extend axially outwardly away from each other.

The multi-phase coil terminal structure (hereinafter be referred to simply as "terminal structure) 7t mentioned earlier is formed at an axially center circumference of the bobbin 7. The terminal structure 7t includes a terminal base 7p which has a substantially rectangular cube shape.

Figure 3B:
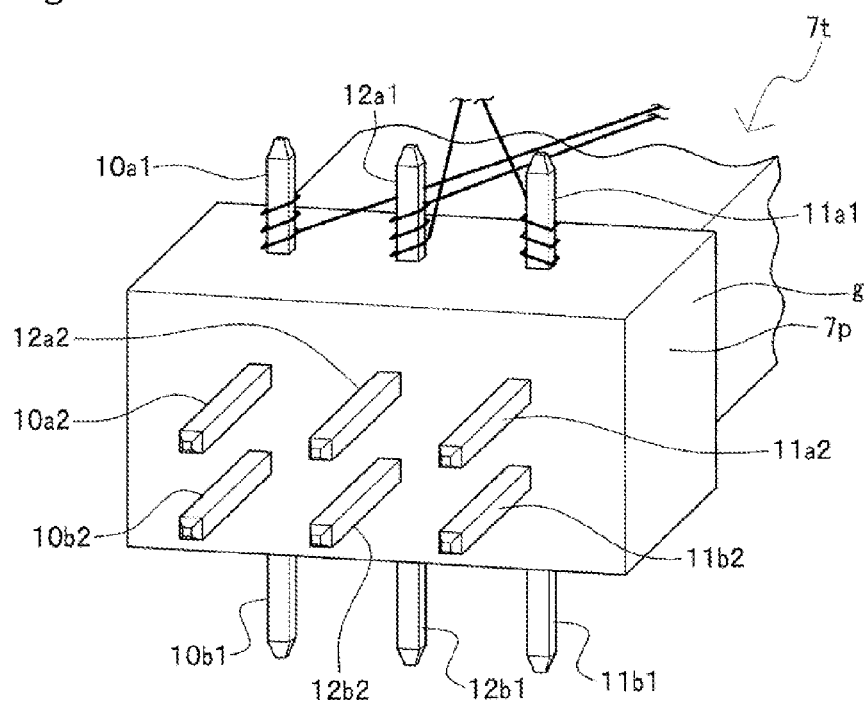
FIG. 3B is an enlarged perspective view of the terminal structure (shown in FIG. 1) of the stator of FIG. 3A.

FIG. 3B perspectively shows the terminal structure 7t in an enlarged manner. Referring to FIG. 3B and also FIG. 8A as well, the terminal structure 7t also includes, embedded partly in the terminal base 7p, two first individual terminals 10a and 11a, and a first common terminal 12a located between the two first individual terminals 10a and 11a, wherein the two first individual terminals 10a and 11a include two segments 10a1 and 10a2, and two segments 11a1 and 11a2, respectively, and wherein the first common terminal 12a includes two segments 12a1 and 12a2. The two first individual terminals 10a and 11a, and the first common terminal 12a are provided at one axial side of the terminal base 7p located toward the first exciting coil 5 so as to correspond to the first exciting coil 5.

The terminal structure 7t further includes, embedded partly in at the terminal base 7p, two second individual terminals 10b and 11b, and a second common terminal 12b located between the two second individual terminals 10b and 11b, wherein the two second individual terminals 10b and 11b includes two segments 10b1 and 10b2, and two segments 11b1 and 11b2, respectively, and wherein the first common terminal 12a includes two segments 12b1 and 12b2. The two second individual terminals 10b and 11b, and the second common terminal 12b are provided at the other axial side of the terminal base 7p located toward the second exciting coil 6 so as to correspond to the second exiting coil 6.

The first individual terminals 10a and 11a, the second individual terminals 10b and 11b, and the first and second common terminals 12a and 12b are formed to have a substantially L-shape composed of two arms, and the two arms of the L-shape of each of the first individual terminals 10a and 11a, the second individual terminals 10b and 11b, and the first and second common terminals 12a and 12b correspond respectively to the two segments of each of the first individual terminals 10a and 11a, the second individual terminals 10b and 11b, and the first and second common terminals 12a and 12b.

Bifilar (two-wire) windings are wound around the bobbin 7 of the stator 1K shown in FIG. 3A. Specifically, in the stator 1K, a first bifilar winding 5a+5b of two phases is wound at one axial side of the bobbin 7 while a second bifilar winding 6a+6b of two phases is wound at the other axial side of the bobbin 7, thus providing windings 5a, 5b, 6a and 6b for a total of four phases.

Description will be made of connection between wire ends of the first and second exciting coils 5 and 6 (specifically, the first and second bifilar windings 5a+5b and 6a+6b) and the terminals (specifically, the segments) described above.

FIG. 4 schematically shows, in an enlarged manner, the terminal structure 7t of the stator 1K as seen in a direction indicated by an arrow A shown in FIG. 3A. Referring to FIG. 4, in the terminal structure 7t of the stator 1K shown in FIG. 3A, a starting wire end 5b1 of one winding 5b of the first bifilar winding 5a+5b and a finishing wire end 5a2 of the other winding 5a of the first bifilar winding 5a+5b are wrapped around the segment 12a1 of the first common terminal 12a at the one axial side of the bobbin 7, which is positioned toward the first exciting coil 5.

Also, a finishing wire end 5b2 of the one winding 5b of the first bifilar winding 5a+5b is wrapped around the segment 10a1 of the first individual terminal 10a while a starting wire end 5a1 of the other winding 5a of the first bifilar winding 5a+5b is wrapped around the segment 11a1 of the first individual terminal 11a.

Solder h1 is applied to a portion which is located in an exposed area of each of the three segments 10a1, 11a1 and 12a1 embedded partly in the terminal base 7p and projecting axially from the terminal base 7p toward the first exciting coil 5, and around which at least one of the wire ends 5a1, 5a2, 5b1 and 5b2 of the first bifilar windings 5a+5b of the first exciting coil 5 is wrapped.

Figure 5:
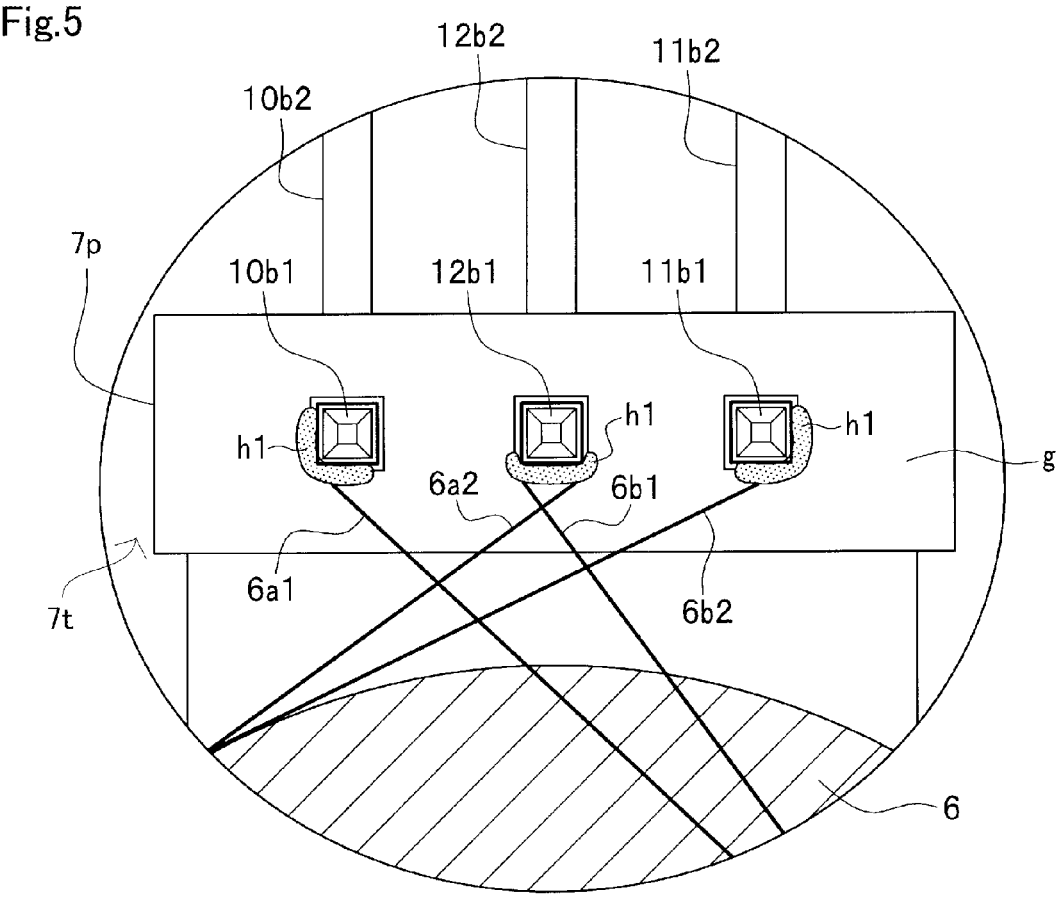
FIG. 5 is an enlarged schematic view of the terminal structure of the stator of FIG. 3A as seen in a direction indicated by an arrow B shown in FIG. 3A.

FIG. 5 schematically shows, in an enlarged manner, the terminal structure 7t of the stator 1K as seen in a direction indicated by an arrow B shown in FIG. 3A. Referring to FIG. 5, in like manner as described above with reference to FIG. 4, a starting wire end 6b1 of one winding 6b of the second bifilar winding 6a+6b and a finishing wire end 6a2 of the other winding 6a of the second bifilar winding 6a+6b are wrapped around the segment 12b1 of the second common terminal 12b at the other axial side of the bobbin 7, which is positioned toward the second exciting coil 6.

Also, a finishing wire end 6b2 of the one winding 6b of the second bifilar winding 6a+6b is wrapped around the segment 11b1 of the second terminal 11b while a starting wire end 6a1 of the other winding 6a of the second bifilar winding 6a+6b is wrapped around the segment 10b1 of the second individual terminal 10b.

Solder h1 is applied to a portion which is located in an exposed area of each of the three segments 10b1, 11b1 and 12b1 embedded partly in the terminal base 7p and projecting axially from the terminal base 7p toward the second exciting winding 6, and around which at least one of the wire ends 6a1, 6a2, 6b1 and 6b2 of the second bifilar winding 6a+6b of the second exciting coil 6 is wrapped.

Figure 6:
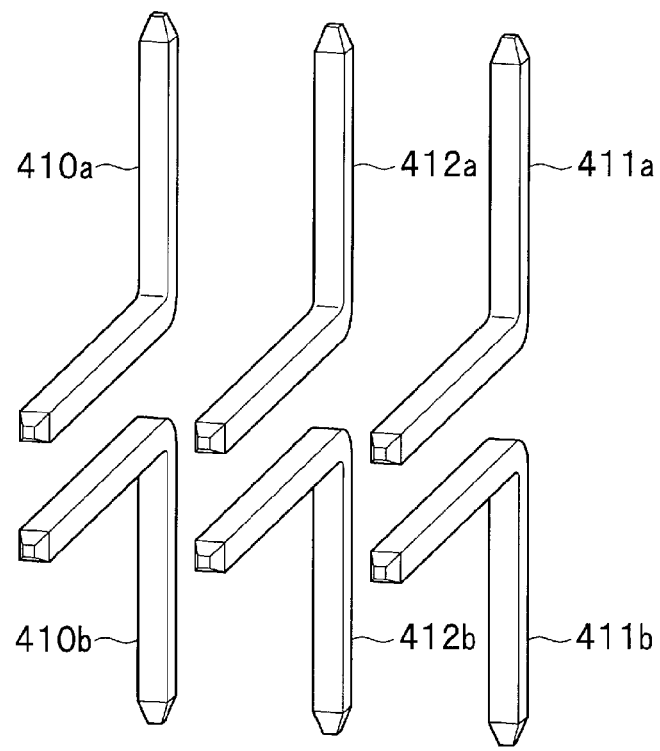
FIG. 6 is a perspective view of Comparative Example 1 (conventional) of terminal arrangement including individual terminals and a common terminal which are arranged at one axial side of a bobbin, and individual terminals and a common terminal which are arranged at the other axial side of the bobbin.

FIG. 6 shows Comparative Example 1 (conventional) of terminal arrangement in which individual terminals 410a and 411a and a common terminal 412a are arranged at one axial side of a bobbin, while individual terminals 410b and 411b and a common terminal 412b are arranged at the other axial side of the bobbin.

In the above described terminal arrangement of Comparative Example 1, since the common terminals 412a and 412b are provided separately from each other, a component member is necessary which electrically connects between the common terminals 412a and 412b. Therefore, work processes of production and assembly are required for the electrical connection. Also, since the electrical connection is mechanically accomplished, reliability can be a problem.

Figure 7:
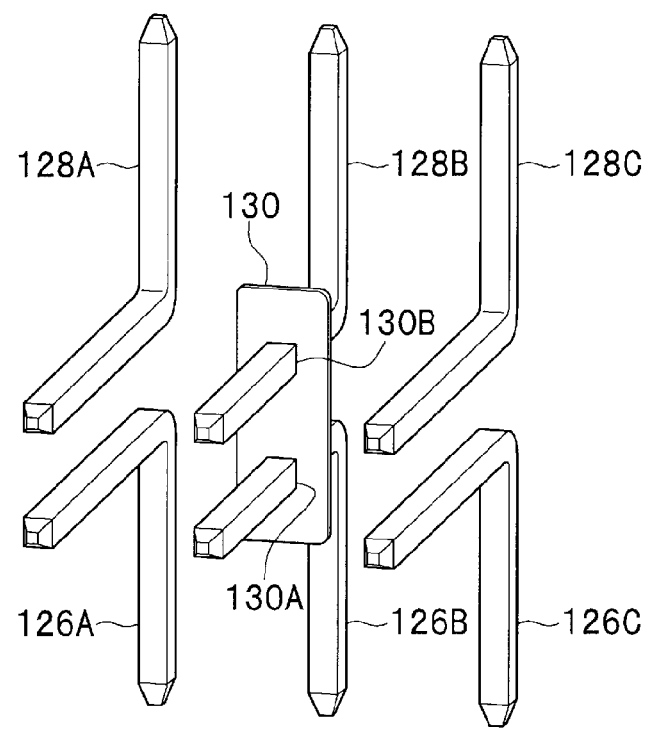
FIG. 7 is a perspective view of Comparative Example 2 (conventional) of terminal arrangement including individual terminals and a common terminal which are arranged at one axial side of a bobbin, and individual terminals and a common terminal which are arranged at the other axial side of the bobbin.

FIG. 7 shows Comparative Example 2 (conventional) of terminal arrangement in which individual terminals 128A and 128C and a common terminal 128B are arranged at one axial side of a bobbin, while individual terminals 126A and 126C and a common terminal 126B are arranged at the other axial side of the bobbin. The terminal arrangement shown in FIG. 7 is almost the same as the terminal arrangement shown in FIG. 15.

In the above described terminal arrangement of Comparative Example 2, a conduction member 130 is used to electrically connect between the common terminals 128B and 126B in such a manner that the common terminals 126B and 128B are inserted respectively in openings 130A and 130B of the conduction member 130 for connection.

In the terminal arrangement of Comparative Example 2, there is a problem, as described earlier, that soldered portions of the common terminals 128B and 126B are scratched by the edges of the openings 130A and 130B thus causing rust, which results in difficulty to assure a long term reliability. Also, there is another problem that since the conduction member 130 is exposed, if wire ends wrapped around other terminals 128A, 128C, 126A and 126C stick out, then an unintended short circuit may be caused between the conduction member 130 and the terminals 128A, 128C, 126A and 126C. Further, since the electrical connection is mechanically accomplished, reliability can be a problem.

Figure 8A:
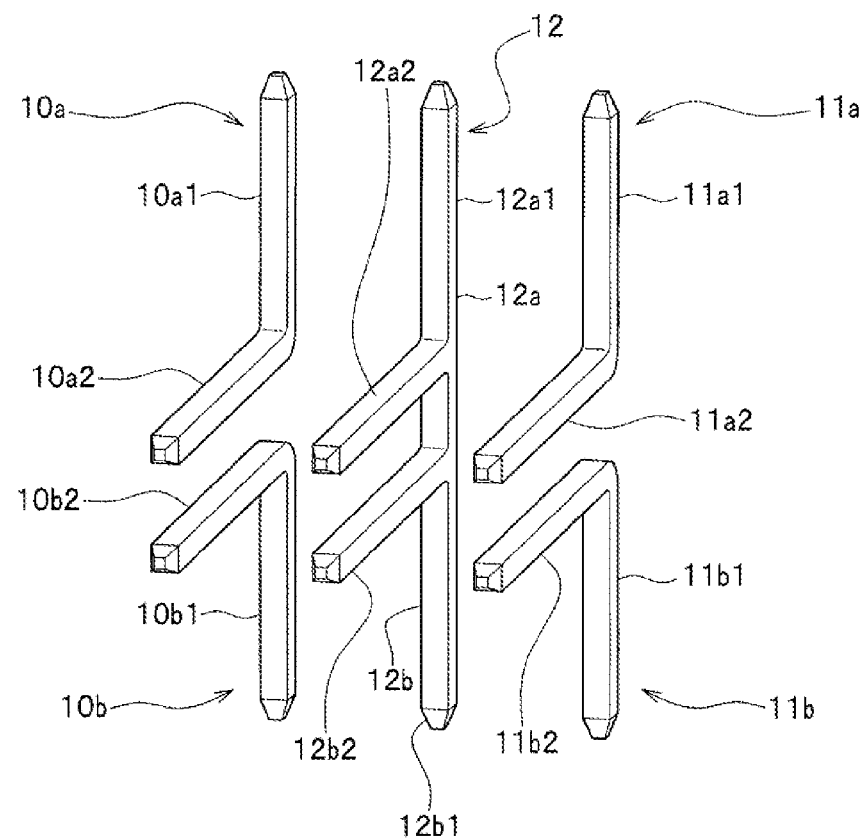
FIG. 8A is a perspective view of a terminal arrangement, specifically individual terminals and an integrated common terminal arranged in the terminal structure according to the first embodiment.

FIG. 8A perspectively shows, in a detailed manner, a terminal arrangement of the terminal structure 7t according to the first embodiment. Referring to FIG. 8A, the two first individual terminals 10a and 11a, the two second individual terminals 10b and 11b, and the first and second common terminals 12a and 12b are formed to have a substantially L-shape. The two first individual terminals 10a and 11a and the first common terminal 12a are arranged at one side of the terminal base 7p, and the two second individual terminals 10b and 11b and the second common terminal 12b are arranged at the other side of the terminal base 7p, wherein the first and second common terminals 12a and 12b are connected to each other and formed into a single piece member, specifically an integrated common terminal 12.

Figure 8B:
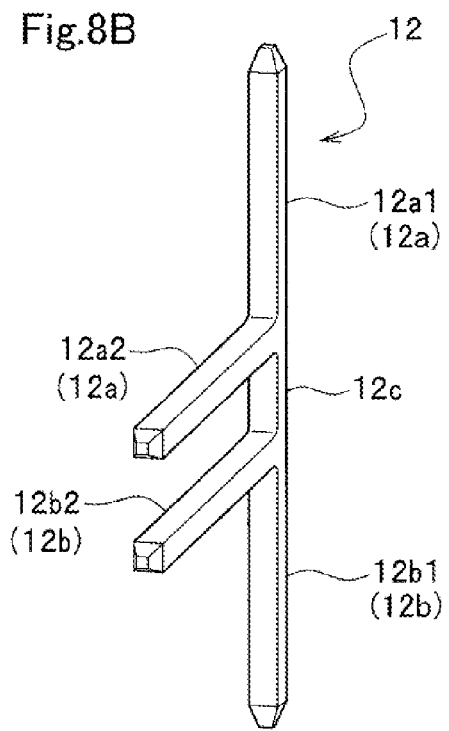
FIG. 8B is a perspective view of exclusively the integrated common terminal shown in FIG. 8A.

FIG. 8B perspectively shows exclusively the integrated common terminal 12 shown in the terminal arrangement of FIG. 8A. Referring to FIGS. 8A and 8B, the integrated common terminal 12 includes the first and second common terminals 12a and 12b, and further an intermediate portion 12c and is formed such that a joining point between the two arms of the L-shape of the first common terminal 12a and a joining point between the two arms of the L-shape of the second common terminal 12b are integrally joined to each other via the intermediate portion 12c thus forming a substantially T-shape with two legs, whereby the first and second common terminals 12a and 12b can be electrically connected to each other in a more reliable manner compared with Comparative Examples 1 and 2 shown in FIGS. 6 and 7, respectively.

The integrated common terminal 12 is shaped symmetric with respect to a horizontal line (in FIG. 8B), and therefore a directional property or orientation is not involved, which results in making the assembly work easier thus improving the workability.

The integrated common terminal 12 is formed by press punching. Of course, the integrated terminal may be formed by other methods than press punching.

The first individual terminals 10a (segments 10a1 and 10a2) and 11a (segments 11a1 and 11a2), and the second individual terminals 10b (segments 10b1 and s10b2) and 11b (segments 11b1 and 11b2) are made of a pin formed to have a substantially L-shape.

The integrated common terminal 12 which is made of a pin and integrally formed as a single piece member (refer to FIG. 8B), and the four individual terminals 10a, 11a, 10b and 11b which are made of a pin formed to have a substantially L-shape are insert-molded together by using an insulating synthetic resin g, whereby the terminal structure 7t is formed.

<Method of Forming the Stator 1k>

Description will now be made of a method of forming the stator 1K applied to the two exciting coils (specifically, the first and second exciting coils 5 and 6).

Figure 9:
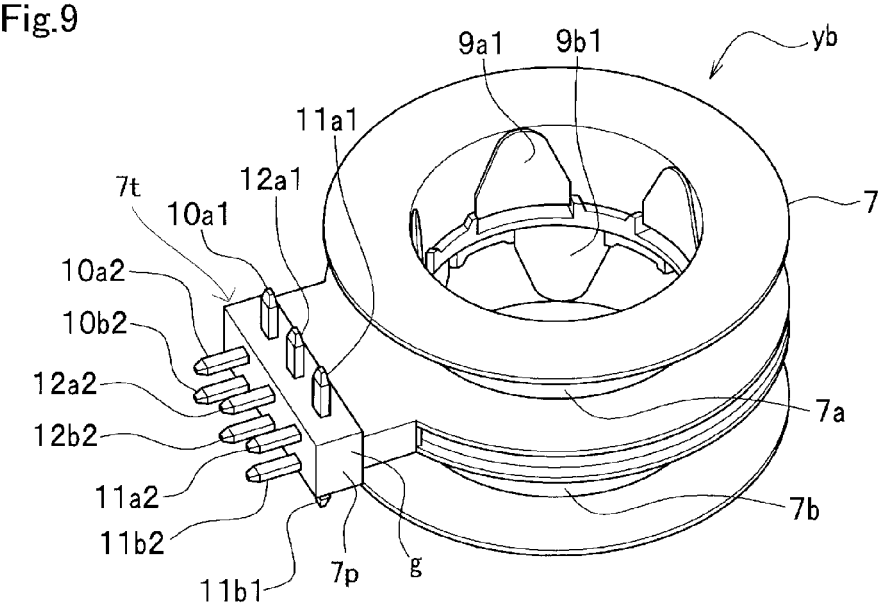
FIG. 9 is a perspective view of a yoke-bobbin structure in a process of assembling the stator.

FIG. 9 perspectively shows a yoke-bobbin structure yb prepared in the process of assembling the stator 1K.

The bobbin 7 for the first and second exciting coils 5 and 6 includes a first individual bobbin 7a for two-phase A and a second individual bobbin 7b for two-phase B, which are formed at the same time when the first individual terminals 10a and 11a provided at one axial side of the terminal base 7p, the second individual terminals 10b and 11b provided at the other axial side of the terminal base 7p, and the integrated common terminal 12 are simultaneously insert-molded together by using the insulating synthetic resin g in such a manner that bent portions of the L-shape of the first and second individual terminals 10a, 11a, 10b and 11b, and the first and second common terminals 12a and 12b of the integrated common terminal 12 as well as the whole of the intermediate portion 12c are solidly covered in the insulating synthetic resin g, wherein the first and second individual bobbins 7a and 7b are joined to each other at the terminal base 7p so as to be integrally molded at the same time.

In this connection, it is advisable that the first and second inner yokes 9a and 9b (earlier mentioned and to be detailed later; refer to FIGS. 10A and 10B), which are arranged side by side in the axial direction, are also molded at the same time as shown in FIG. 9.

Figure 10A:
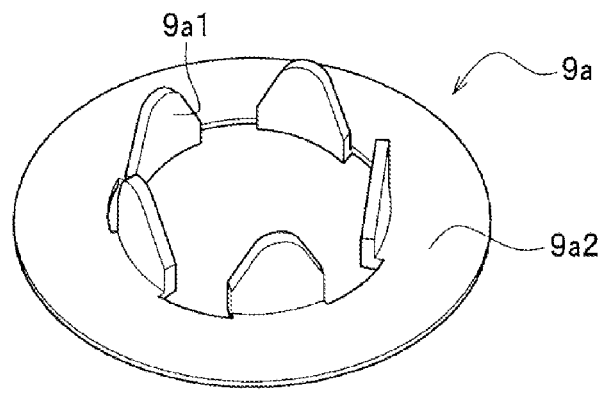
FIG. 10A is a perspective view of a first inner yoke.

FIG. 10A perspectively shows the first inner yoke 9a mentioned above, and FIG. 10B perspectively shows the second inner yoke 9b mentioned above.

Referring to FIG. 10A, the first inner yoke 9a includes a ring-shaped plate portion 9a2, and a plurality of first pole teeth 9a1 which have a substantially triangular shape, which are located along an inner circumference of the ring-shaped plate portion 9a2, and which are bent to extend axially outwardly away from the second inner yoke 9b.

Figure 10B:
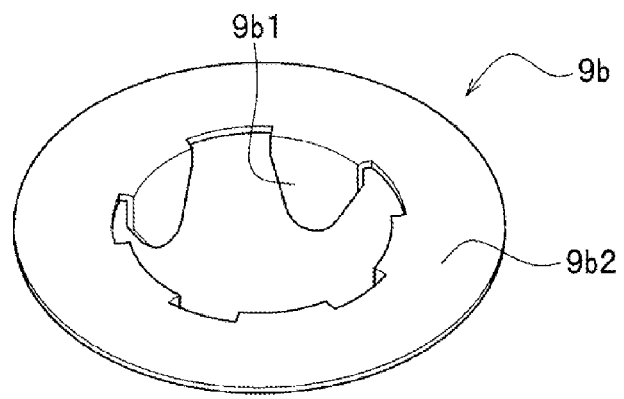
FIG. 10B is a perspective view of a second inner yoke.

Referring to FIG. 10B, the second inner yoke 9b includes a ring-shaped plate portion 9b2, and a plurality of second pole teeth 9b1 which have a substantially triangular shape, which are located along an inner circumference of the ring-shaped plate portion 9b2, and which are bent to extend axially outwardly away from the first inner yoke 9a. The first and second inner yokes 9a and 9b are made of a magnetic steel sheet or a like material and formed by press punching.

If the first and second inner yokes 9a and 9b are also molded at the same time as described above, then the first and second individual bobbins 7a and 7b for the first and second exciting coils 5 and 6, the group of terminals (10a, 11a, 10b, 11b, 12), and the first and second inner yokes 9a and 9b can be insert-molded at one time by a single shot injection. Thus, the yoke-bobbin structure yb is formed.

Then, the first bifilar winding 5a+5b and the second bifilar winding 6a+6b are wound respectively around the first and second individual bobbins 7a and 7b of the yoke-bobbin structure yb.

As described earlier with reference to FIG. 4, the starting wire end 5b1 of the one winding 5b of the first bifilar winding 5a+5b and the finishing wire end 5a2 of the other winding 5a of the first bifilar winding 5a+5b are wrapped around the segment 12a1 of the first common terminal 12a positioned toward one axial side (side of the first individual bobbin 7a) of the bobbin 7 of the yoke-bobbin structure yb.

Also, the finishing wire end 5b2 of the one winding 5b of the first bifilar winding 5a+5b is wrapped around the segment 10a1 of the first individual terminal 10a while the starting wire end 5a1 of the other winding 5a of the first bifilar winding 5a+5b is wrapped around the segment 11a1 of the first individual terminal 11a.

In the same way, as shown in FIG. 5, the starting wire end 6b1 of the one winding 6b of the second bifilar winding 6a+6b and the finishing wire end 6a2 of the other winding 6a of the second bifilar winding 6a+6b are wrapped around the segment 12b1 of the second common terminal 12b positioned toward the other axial side (side of the second individual bobbin 7b) of the bobbin 7 of the yoke-bobbin structure yb.

Also, the finishing wire end 6b2 of the one winding 6b of the second bifilar winding 6a+6b is wrapped around the segment 11b1 of the second individual 11b while the starting wire end 6a1 of the other winding 6a of the second bifilar winding 6a+6b is wrapped around the segment 10b1 of the second individual 10b.

And, solder h1 is applied to a portion which is located in an exposed area of each of the three segments 10a1, 11a1 and 12a1 embedded partly in the terminal base 7p and projecting axially from the terminal base 7p toward the first individual bobbin 7a, and around which at least one of the wire ends 5a1, 5a2, 5b1 and 5b2 of the first bifilar winding 5a+5b of the first exciting coil 5 is wrapped (refer to FIG. 4).

Also, solder h1 is applied to a portion which is located in an exposed area of each of the three segments 10b1, 11b1 and 12b1 embedded partly in the terminal base 7p and projecting axially from the terminal base 7p toward the second individual bobbin 7b, and around which at least one of the wire ends 6a1, 6a2, 6b1 and 6b2 of the second bifilar winding 6b+6b of the second exciting coil 6 is wrapped (refer to FIG. 5).

Figure 11:
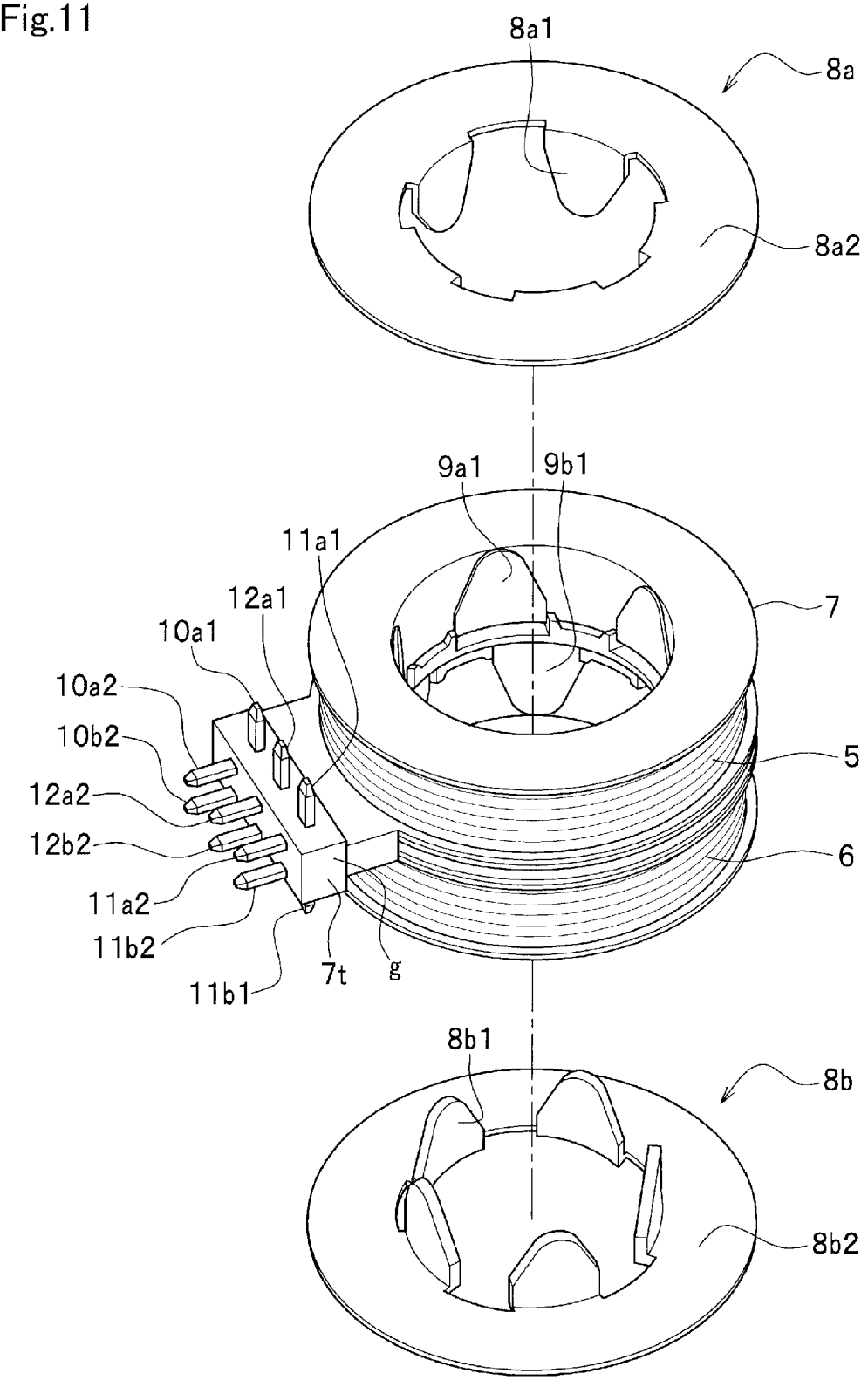
FIG. 11 is a perspective view of a process of attaching first and second outer yokes to the yoke-bobbin structure having windings wound therearound.

FIG. 11 perspectively shows a process in which the first and second outer yokes 8a and 8b are attached to the yoke-bobbin structure yb around which the first and second exciting coils 5 and 6 are wound. Referring to FIG. 11, the first outer yoke 8a includes a ring-shaped plate portion 8a2 and a plurality of first pole teeth 8a1 which have a substantially triangular shape, which are located along an inner circumference of the ring-shaped plate portion 8a2, and which are bent to extend axially inwardly toward the second outer yoke 8b.

Also, in the same way, the second outer yoke 8b includes a ring-shaped plate portion 8b2 and a plurality of first pole teeth 8b1 which have a substantially triangular shape, which are located along an inner circumference of the ring-shaped plate portion 8b2, and which are bent to extend axially inwardly toward the first outer yoke 8a.

The first and second outer yokes 8a and 8b are made of a magnetic steel sheet or a like material and formed by press punching. The first and second outer yokes 8a and 8b, which are prepared beforehand as described above, are then attached respectively to both the axial ends of the yoke-bobbin structure yb, whereby the stator 1K is completed.

A connector (not shown in the figures) or the like is attached to six of the segments 10a2, 11a2, 12a2, 10b2, 11b2 and 12b2 which protrude radially outwardly from an outer circumferential surface of the terminal base 7p of the terminal structure 7t, and which serve as external outputs, whereby the electrical connection is made to a control circuit or the like.

In the configuration described above, the integrated common terminal 12 is structured as a single piece member such that the intermediate portion 12c is provided to integrally join between the first and second common terminals 12a and 12b in such a manner that the integrated common terminal 12 is formed to have a substantially T-shape with two legs.

Since the integrated common terminal 12 is integrally formed into a single piece member as described above, and also since there are provided a plurality of external outputs which are served by the segments 10a2, 11a2, 12a2, 10b2, 11b2 and 12b2, a variety of external connection specifications can be realized.

The integrated common terminal 12, the first and second outer yokes 8a and 8b, the first and second inner yokes 9a and 9b, and also the bobbin 7 are configured symmetric with respect to an axial center plane of the yoke-bobbin structure yb. Therefore, it is not necessary to pay attention to the directional property (orientation) of the assembly or the integrated common terminal 12 in each process of assembly work, which makes the assembly work easier thus improving the workability.

Also, due to the configuration described above, a defective product problem, which may be conventionally caused by mistaking the directional property (orientation) of a common terminal (for example, refer to the common terminals 325a and 326a shown in FIG. 17), can be eliminated.

Further, since there are provided two external outputs, specifically the segments 12a2 and 12b2, for the integrated common terminal 12, even if there is a trouble with one of the segments 12a2 and 12b2, then the other one thereof is adapted to perform a backup function. Or, it may be arranged such that the segments 12a2 and 12b2 perform respective different functions. Accordingly, the flexibility is increased for users, thus offering a convenient usability.

Also, the integrated common terminal 12 is structured as a single piece member and is covered, except the distal end areas of respective segments, with the synthetic resin g to form the bobbin 7 (that is to say, the intermediate portion 12c is entirely covered). Therefore, the integrated common terminal 12 has no or a reduced chance to make contact with oxygen and is suppressed or prevented from having rust. As a result, the reliability is increased.

For the reason of convenience, generally, terminals are often made in such a manner that a wire rod having a cross section of a rectangular or circular shape is bent. However, in the case of the integrated common terminal 12 according to the first embodiment of the present invention, it is rather hard to produce by bending work, so it is rational to produce the integrated common terminal 12 by press punching as described earlier.

Also, both of the segments serving as external outputs of the integrated common terminal 12 are kept available, whereby a wide range of needs for users can be duly met.

In addition, the integrated common terminal 12 having the segments of the same electric potential is formed into a single piece member, whereby a mechanical connection inside a circuit is eliminated, and thus the reliability of an electrical connection is increased.

Further, a short-circuited or connected area, specifically, the intermediate portion 12c, is covered inside a molding material (the synthetic resin g), and thereby the connection portion is suppressed or prevented from being subject to external influences. And, the structure can be simplified by forming the integrated common terminal 12 into a single piece member.

The above described configuration according to the first embodiment of the present invention has the following advantages compared with the conventional arts.

Figure 15:
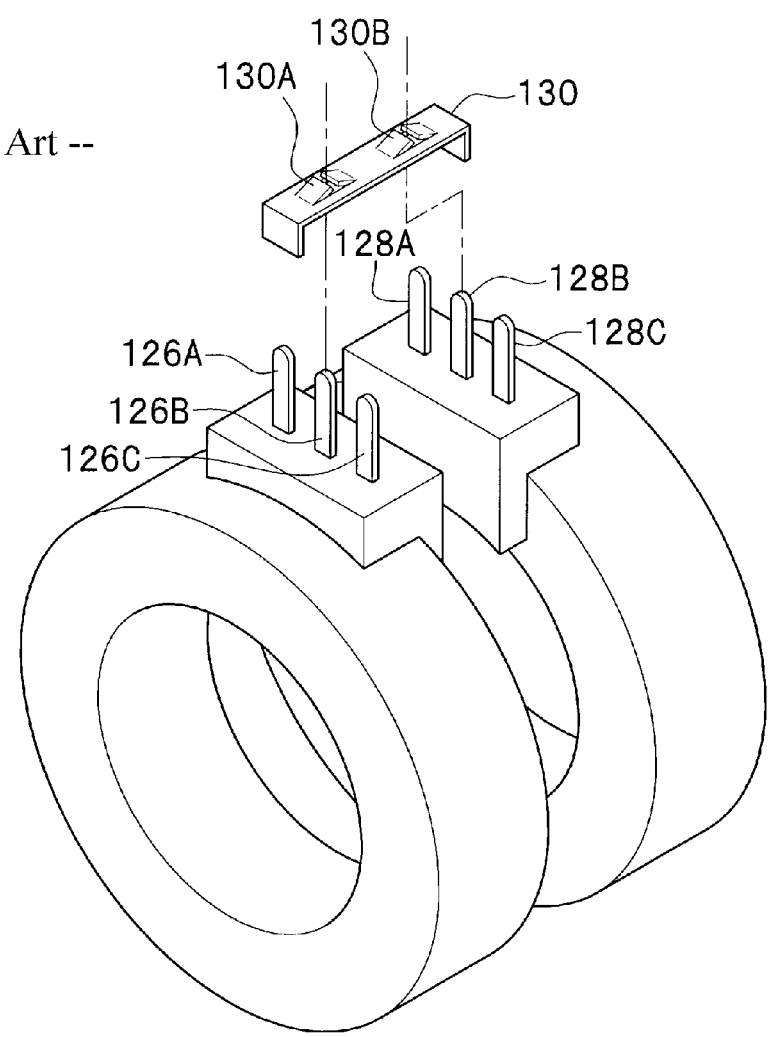
FIG. 15 is an exploded perspective view of a conventional terminal structure of a stator in a motor.

Compared with the conventional arts described in Japanese Patent Application Laid-Open No. H02-294299 and Japanese Patent Application Laid-Open No. 2006-238617, a component member, such as the conduction member 130 shown in FIG. 15, the terminal substrate 250 shown in FIG. 16, or the like can be eliminated, thus enabling a cost reduction. Also, the process of assembling those component members is eliminated, so the cost reduction is further facilitated. And, deterioration of the reliability, which is attributed to the assembly of those component members, can be avoided.

Now, in the conventional art described in Japanese Patent Publication Laid-Open No. H09-308215, for the reason for designing a device to be connected, the two common terminals 325a and 326a are formed into a single piece so as to form the output terminal 325b as shown in FIG. 17.

Compared with the conventional art described above, in the first embodiment of the present invention, for the purpose of meeting a variety of external connection specifications demanded from users and also eliminating directional property (orientation) in the motor assembly, the two common terminals 12a and 12b are formed into a single piece member, specifically the integrated common terminal 12, and also the two segments 12a2 and 12b2 of the integrated common terminal 12 are kept available as external outputs.

Accordingly, a universal standard type connector can be used together with a magnetic pole configuration demanded from users, and thus a variety of specifications demanded from users can be flexibly met. Also, since the first individual terminals 10a and 11ba, and the first common terminal 12a are disposed to be symmetric respectively to the second individual terminals 10b and 11b, and the second common terminal 12b, the directional property (orientation) of the terminals is eliminated, and so the number of assembly processes can be reduced.

Further, for the users, the wiring of a harness can be easily changed, thus enabling a cost reduction. Also, due to the reduction of the number of component members, a design for desirable product specifications, such as weight reduction or the like is enabled.

Also, since the segments 10a2, 11a2, 12a2, 10b2, 11b2 and 12b2 which serve as external outputs are arranged in two rows, an electrical connection can be made to a control circuit (not shown in the figures) or the like by means of a universal standard type two row connector.

Consequently, the multi-phase coil terminal structure (terminal structure) 7t can be produced with cost increase held down while a high reliability is secured, and also the claw pole type motor (motor) 1 including such a terminal structure can be produced.

Modified Embodiment

Description will now be made of a multi-phase coil terminal structure (terminal structure) 27t according to a modified embodiment of the present invention. In describing the modified embodiment (hereinafter referred to as "second embodiment" as appropriate), identical or corresponding component parts are denoted by the same reference number as employed in describing the first embodiment, and a detailed description thereof will be omitted.

In the first embodiment described above, the individual terminals 10a, 11a, 10b and 11b shown in FIG. 8A are made of a pin formed to have a substantially L-shape, and the integrated common terminal 12 shown in FIG. 8B is made as a single piece member formed to have a substantially T-shape with two legs.

Figure 12A:
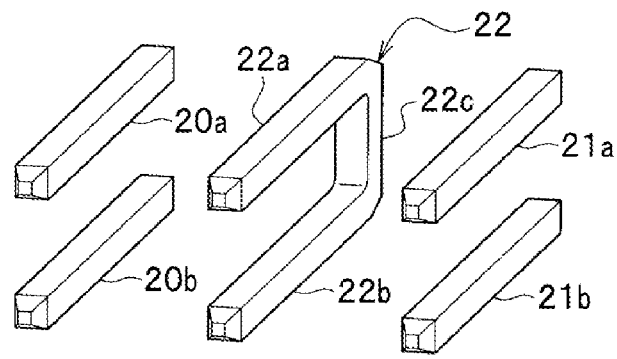
FIG. 12A is a perspective view of a terminal arrangement in a terminal structure according to a second embodiment of the present invention.
Figure 12B:
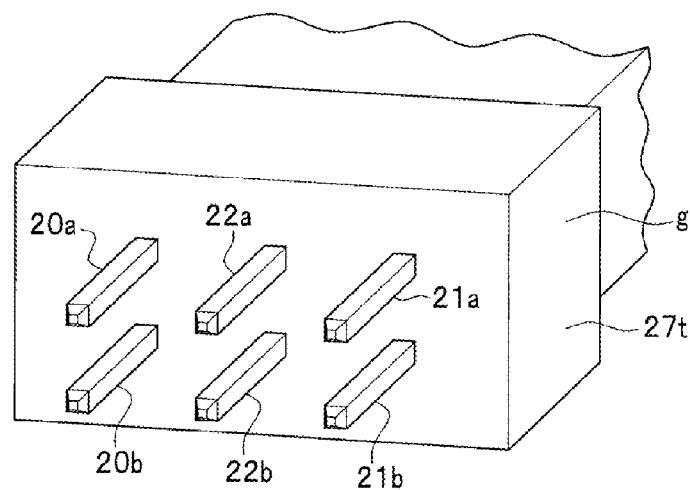
FIG. 12B is a perspective view of the terminal structure according to the second embodiment.
Figure 12C:
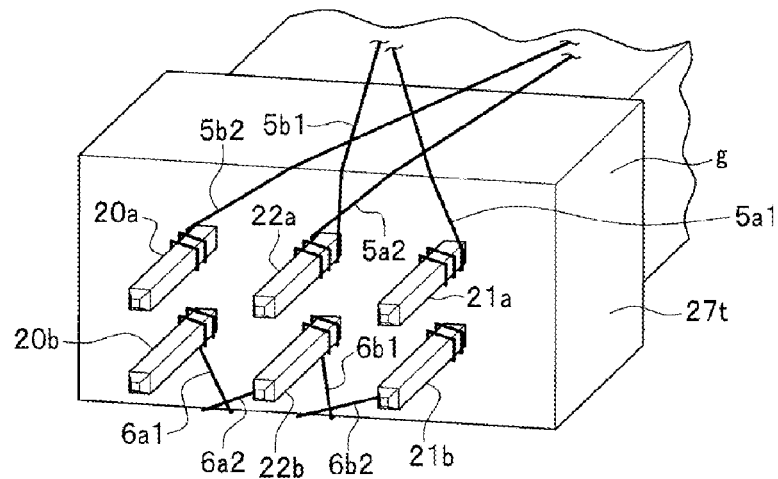

FIG. 12A perspectively shows a terminal arrangement of the terminal structure 27t according to the second embodiment, FIG. 12B perspectively shows the terminal structure 27t according to the second embodiment, and FIG. 12C perspectively shows the terminal structure 27t wherein starting and/or finishing wire ends of first and second exciting coils 5 and 6 are wrapped around terminals of the terminal structure 27t.

Referring to FIG. 12A, in the second embodiment, first individual terminals 20a and 21a, second individual terminals 20b and 21b, and an integrated common terminal 22 are formed to have a simple shape, compared with the terminals according to the first embodiment in which the individual terminals 10a, 11a, 10b and 11b are formed to have a substantially L-shape, and the integrated common terminal 12 is formed to have a substantially T-shape with two legs. Specifically, the first and second individual terminals 20a, 21a, 20b and 21b in the second embodiment are formed to have a substantially I-shape as shown in FIG. 12A, and thus a straight wire rod can be directly applied for producing the first and second individual terminals 20a, 21a, 20b and 21b.

The integrated common terminal 22 according to the second embodiment includes first and second common terminals 22a and 22b which are also formed to have a substantially I-shape, and further an intermediate portion 22c and is formed such that the intermediate portion 22c is provided to integrally connect between respective one ends of the first and second common terminals 22a and 22b which are arranged parallel to each other, thus forming a substantially square U-shape.

The first common terminal 22a is located between the two first individual terminals 20a and 21a, and the second common terminal 22b is located between the two second individual terminals 20b and 21b. The integrated common terminal 22 is produced by bending a wire rod into a substantially square U-shape. In this connection, the integrated common terminal 22 may be formed by alternative methods.

And, the first and second individual terminals 20a, 21a, 20b and 21b, and the integrated common terminal 22 are simultaneously insert-molded together by using an insulating synthetic resin g in such a manner that one end portions of the I-shape of the first and second individual terminals 20a, 21a, 20b and 21b and the first and second common terminals 22a and 22b, as well as the whole of the intermediate portion 22c, are solidly covered in the synthetic resin g, whereby the terminal structure 27t shown in FIG. 12B is formed. Each uncovered area of the first and second individual terminals 20a, 21a, 20b and 21b and the first and second common terminals 22a and 22b includes two segments, specifically a proximal segment and a distal segment.

Referring to FIG. 12C, in the winding process, with respect to one axial side of a bobbin 7 positioned toward a first exciting coil 5, a starting wire end 5b1 of one winding 5b of a first bifilar winding 5a+5b of the first exciting coil 5 and a finishing wire end 5a2 of the other winding 5a of the first bifilar winding 5a+5b of the first exciting coil 5 are wrapped around the proximal segment of the first common terminal 22a of the integrated common terminal 22.

A finishing wire end 5b2 of the one winding 5b of the first bifilar winding 5a+5b of the first exciting coil 5 is wrapped around the proximal segment of the first individual terminal 20a, and a starting wire end 5a1 of the other winding 5a of the first bifilar winding 5a+5b of the first exciting coil 5 is wrapped around the proximal segment of the first individual terminal 21a. Though not shown in the figures, solder is applied to a portion which is located in an exposed area corresponding to the proximal segment of each of the three terminals 20a, 21a and 22a embedded partly in the terminal base 7p and projecting radially from a terminal base 27p, and around which at least one of the wire ends 5a1, 5a2, 5b1 and 5b2 of the first bifilar winding 5a+5b of the first exciting coil 5 are wrapped.

In like manner, with respect to the other axial side of the bobbin 7 positioned toward a second exciting coil 6, a starting wire end 6b1 of one winding 6b of a second bifilar winding 6a+6b of the second exciting coil 6 and a finishing wire end 6a2 of the other winding 6a of the second bifilar winding 6a+6b of the second exciting coil 6 are wrapped around the proximal segment of the second common terminal 22b of the integrated common terminal 22.

A finishing wire end 6b2 of the one winding 6b of the second bifilar winding 6a+6b of the second exciting coil 6 is wrapped around the proximal segment of the second individual terminal 21b, and a starting wire end 6a1 of the other winding 6a of the second bifilar winding 6a+6b of the second exciting coil 6 is wrapped around the proximal segment of the second individual terminal 20b. Though not shown in the figures, solder is applied to a portion which is located in an exposed area corresponding to the proximal segment of each of the three terminals 20b, 21b and 22b embedded partly in the terminal base 7p and projecting radially from the terminal base 27p, and around which at least one of the wire ends 6a1, 6a2, 6b1 and 6b2 of the second bifilar winding 6a+6b of the second exciting coil 6 is wrapped.

An electrical connection is made between a control circuit and the first and second exciting coils 5 and 6 in such a manner that a universal connector is attached to the terminal structure 27t, specifically to the distal segments of the first and second individual terminals 20a, 21a, 20b and 21b, and the first and second common terminals 22a and 22b of the integrated common terminal 22 which are arranged in two rows parallel to each other, specifically such that the three terminals 20a, 21a and 22a are arranged in one line, and the three terminals 20b, 21b and 22b are arranged in another line. Thus, the distal segments of the first and second individual terminals 20a, 21a, 20b and 21b, and the first and second common terminals 22a and 22b of the integrated common terminal 22 serve as the external outputs.

According to the second embodiment, the first and second individual terminals 20a, 21a, 20b and 21b and the integrated common terminal 22 can be produced in a simplified way, thus easing the production and so reducing cost.

In this connection, the common terminal, as long as formed integrally in a single piece member, may have any shape different from what is described above in the first and second embodiment, but in view of convenience for assembly, it is advisable for the integrated common terminal to have a symmetric shape, as described earlier.

Figure 13:
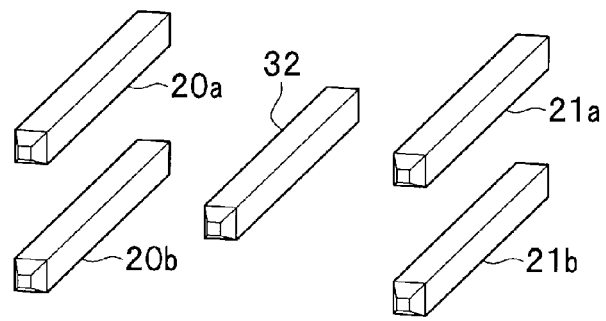
FIG. 13 is a perspective view of a derivative example of terminal arrangement with respect to the terminal structure according to the second embodiment.
Figure 14:
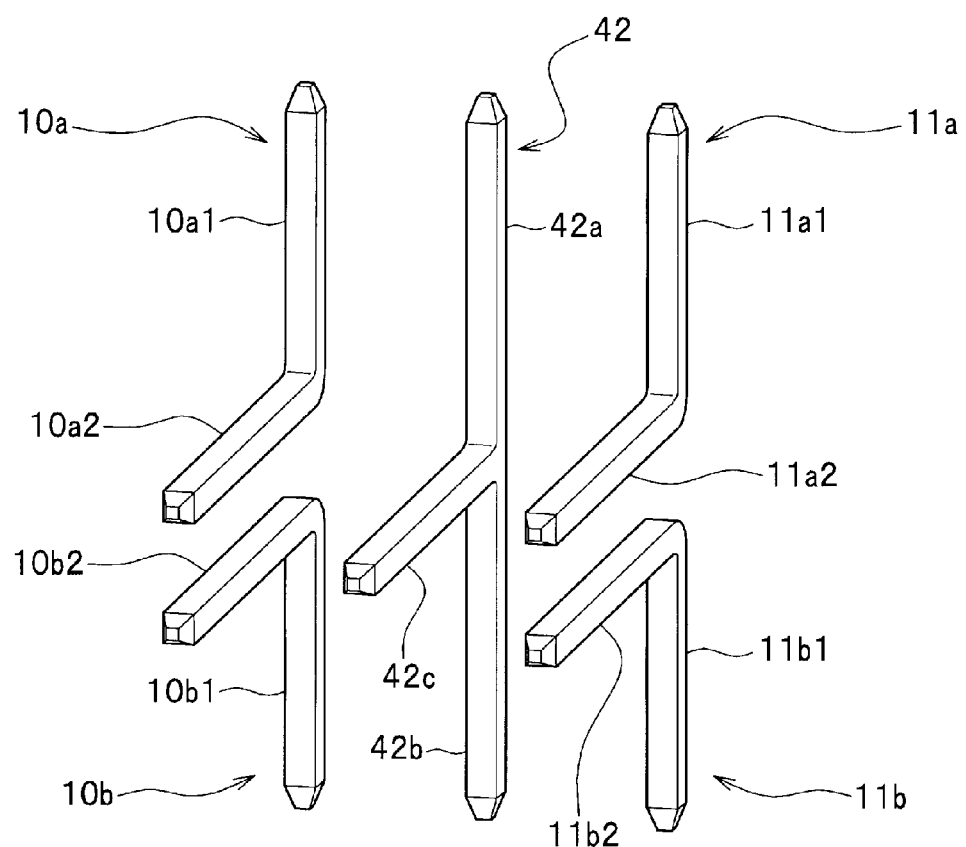
FIG. 14 is a perspective view of a derivative example of terminal arrangement with respect to the terminal structure according to the first embodiment.

FIGS. 13 and 14 perspectively shows derivative examples of terminal arrangements, respectively.

In one example shown in FIG. 13, an integrated common terminal 32 is substituted for the integrated common terminal 22 shown in FIG. 12. The integrated common terminal 32 as a whole is formed in a single piece member to have a substantially I-shape like the first and second individual terminals 20a, 21a, 20b and 21b. In other word, the first and second common terminals 22a and 22b of the integrated common terminal 22 are merged into one piece terminal eliminating the intermediate portion 22c. Consequently, a straight wire rod can be applied directly for producing the integrated common terminal 32, thus enabling a cost reduction.

In another example, referring to FIG. 14, an integrated common terminal 42 is substituted for the integrated common terminal 12 shown in FIG. 8A. The integrated common terminal 42 is formed to integrally include three segments, specifically terminals 42a, 42b and 42c, so as to have a substantially T-shape. In other word, the terminal (segment) 42c is formed in such a manner that the segments 12a2 and 12b2 of the first and second common terminals 12a and 12b of the integrated common terminal 12 are merged into one piece terminal (segment) eliminating the intermediate portion 12c. The terminal (segment) 42c serves as an external output. The integrated common terminal 42 is preferably formed by press punching, which enables a cost reduction.

Starting and/or finishing wire ends of a first bifilar winding 5a+5b of the first exciting coil 5 are wrapped around the terminal 42a, and starting and/or finishing wire ends of a second bifilar winding 6a+6b of the second exciting coil 6 are wrapped around the terminal 42b. A connector is attached to the terminal 42c serving as an external output.

Other Modifications

In the first and second embodiments described above, the bobbin 7 is provided with coils of four phases. However, if a common terminal is formed in a single piece member, the number of phases for coils can be arbitrarily determined, wherein the number of individual terminals is changed corresponding to the number of phases.

In the first and second embodiments described above, the first and second individual bobbins 7a and 7b are molded integrally. However, as long as the common terminal (12, 22, 32, 42) is formed in a single piece member, the first and second individual bobbins 7a and 7b may be formed separately. Also, in the first and second embodiments described above, a common terminal is centrally located so as to be sandwiched between individual terminals, but may be otherwise located.

The present invention has been described with respect to the specific exemplary embodiments as typical examples, and so it is to be understood that various modifications, variations and alterations are possible as appropriate within the scope of the present invention. That is to say, the present invention can be modified without departing from the spirit of the present invention.

What is claimed is:

1. A multi-phase coil terminal structure for a motor, to which wire ends of at least two exciting coils are connected which comprise respective bifilar windings,
the multi-phase coil terminal structure comprising:
at least two first individual terminals which each comprise two segments to one of which a wire end of a first exciting coil of the at least two exciting coils is connected, and the other one of which serves as an external output;
at least two second individual terminals which each comprise two segments to one of which a wire end of a second exciting coil of the at least two exciting coils is connected, and the other one of which serves as an external output; and
an integrated common terminal which is formed in a single piece member and which comprises two segments to one of which wire ends of the first and second exciting coils are connected, and the other one of which serves as an external output,
wherein: the first individual terminals, the second individual terminals, and the integrated common terminal are partly molded with an insulating synthetic resin; the first individual terminals are disposed symmetric respectively to the second individual terminals with a predetermined distance therebetween; and wherein the integrated common terminal is symmetrically configured.

2. A multi-phase coil terminal structure according to claim 1, wherein:
the integrated common terminal integrally comprises a first common terminal, and a second common terminal;
the first individual terminals, the second individual terminals, the first common terminal, and the second common terminal are formed to have a substantially L-shape composed of two arms;
bent portions of the L-shape of the first individual terminals, the second individual terminals, the first common terminal and the second common terminals are solidly covered in the insulating synthetic resin; and
uncovered areas of the two arms of the L-shape of the first individual terminals, the second individual terminals, the first common terminal and the second common terminals correspond respectively to the two segments of the first individual terminals, the second individual terminals, the first common terminal and the second common terminals.

3. A multi-phase coil terminal structure according to claim 2, wherein the integrated common terminal is configured such that respective arms of the L-shape of the first common terminal and the second common terminal, which correspond to respective segments thereof serving as external outputs, are merged and unified into one segment serving as an external output so as to form a substantially T-shape.

4. A multi-phase coil terminal structure according to claim 2, wherein the integrated common terminal further comprises an intermediate portion which integrally bridges between a joining point of the two arms of the L-shape of the first common terminal and a joining point of the two arms of the L-shape of the second common terminal so as to form a substantially T-shape with two legs.

5. A multi-phase coil terminal structure according to claim 1, wherein:
the integrated common terminal integrally comprises a first common terminal, and a second common terminal;
the first individual terminals, the second individual terminals, the first common terminal and the second common terminal are formed to have a substantially I-shape;
one end portions of the I-shape of the first individual terminals, the first common terminal, the second individual terminals and the second common terminals are solidly covered in the insulating synthetic resin; and
proximal and distal portions of an uncovered area of the I-shape of the first individual terminals, the second individual terminals, the first common terminal and the second common terminals correspond respectively to the two segments of the first individual terminals, the second individual terminals, the first common terminal and the second common terminals.

6. A multi-phase coil terminal structure according to claim 5, wherein the integrated common terminal is configured such that the first common terminal and the second common terminal are merged and unified into one terminal having a substantially I-shape.

7. A multi-phase coil terminal structure according to claim 5, wherein the integrated common terminal further comprises an intermediate portion which integrally bridges between one end of the first common terminal and one end of the second common terminal so as to form a substantially square U-shape.

8. A multi-phase coil terminal structure according to claim 1, wherein the integrated common terminal is centrally positioned such that the at least two first individual terminals sandwich the integrated common terminal and the at least two second individual terminals sandwich the integrated common terminal.

9. A multi-phase coil terminal structure according to claim 1, wherein the integrated common terminal is formed by press punching.

10. A motor comprising a multi-phase coil terminal structure according to claim 1.

* * * * *